United States Patent
Rafailov et al.

(10) Patent No.: US 8,542,712 B2
(45) Date of Patent: Sep. 24, 2013

(54) PHOTONIC DEVICES BASED ON CONICAL REFRACTION

(75) Inventors: Edik Rafailov, Dundee (GB); Amin Abdolvand, Dundee (GB); Todor Kalkandjiev, Dundee (GB)

(73) Assignee: University of Dundee, Nethergate, Dunkee (GB)

( * ) Notice: Subject to any disclaimer, the term of this patent is extended or adjusted under 35 U.S.C. 154(b) by 0 days.

(21) Appl. No.: 13/145,736

(22) PCT Filed: Jan. 21, 2010

(86) PCT No.: PCT/GB2010/000091
§ 371 (c)(1),
(2), (4) Date: Nov. 23, 2011

(87) PCT Pub. No.: WO2010/084317
PCT Pub. Date: Jul. 29, 2010

(65) Prior Publication Data
US 2012/0082179 A1     Apr. 5, 2012

(30) Foreign Application Priority Data

Jan. 21, 2009 (GB) .................................. 0900956.4
Nov. 26, 2009 (GB) .................................. 0920731.7

(51) Int. Cl.
*H01S 3/06*     (2006.01)

(52) U.S. Cl.
USPC .............................. 372/66; 372/99; 359/641

(58) Field of Classification Search
USPC ......................................... 372/66, 99; 359/641
See application file for complete search history.

(56) References Cited

U.S. PATENT DOCUMENTS

2006/0193044 A1*   8/2006  Blum et al. .................. 359/487
2007/0171432 A1    7/2007  Neuhauser et al.

FOREIGN PATENT DOCUMENTS

WO           2005109044 A1   11/2005

OTHER PUBLICATIONS

Kalkandjiev et al.,"Conical Refraction: an Experimental Indtroduction," Proc. of SPIE, vol. 6994, Apr. 25, 2008, pp. 69940B-1, DOI: 10.1117/12.780793.
Demidovich et al.,"Continuous-Wave Raman Genration in a Diode-Pumped Nd3+:DGd(WO4)2 Laser," Optics Letters, vol. 30, No. 13, Jul. 2005, pp. 1701-1703, DOI:10.1364/OL.30.001701.

* cited by examiner

*Primary Examiner* — Yuanda Zhang
(74) *Attorney, Agent, or Firm* — Fox Rothschild LLP

(57) ABSTRACT

An optical system (31) with an input optical source (33) for projecting an input beam along an optical axis and an optical element (37, 43) which creates a cone refracted beam (41) from the input beam (35) then reconstructs the input beam (49). The optical element may comprise a first cone refractive element (37) which creates a cone refracted beam and reconstructs the beam using a reconstructing optical element (43) to apply a phase shift to the cone refracted beam. The optical system may be used to form a laser or a gain medium for a laser.

20 Claims, 6 Drawing Sheets

PHOTONIC DEVICES BASED ON CONICAL REFRACTION

INTRODUCTION

This application claims the priority benefit of PCT Application No. PCT/GB2010/000091 filed on Jan. 21, 2010, claiming priority to Great Britain Patent Application GB0900956.4 filed on Jan. 21, 2009, and Great Britain Patent Application GB0920731.7, filed on Nov. 27, 2009. The contents of all applications are each hereby incorporated by reference in their entirety.

The present invention relates to novel photonic devices which use conical refraction to improve the quality of the light beam. This includes but is not limited to lasers.

BACKGROUND

In 1832 Hamilton predicted conical refraction, concluding that if a beam propagates along an optic axis of a biaxial crystal, a hollow cone of light will emerge. Shortly afterwards, Lloyd observed the hollow light cone using a natural biaxial crystal and sunlight. Modern studies refer to conical refraction as conical diffraction since its theoretical description requires the inclusion of wave effects, these terms are synonymous.

The optical effects and devices based on conical refraction (CR) phenomenon are of fundamental and practical importance in the field of photonics since most of the known crystal structures are optically biaxial. Yet there are relatively few studies of the phenomenon available. Recent interest is driven by the availability of modern crystal growth, cutting and polishing technologies having advanced to a stage where producing crystals with the correct orientation is now possible. Observation of the CR phenomenon is made using the apparatus as shown in FIG. 1 which comprises a laser 3, a lens 5 and an optically biaxial CR crystal 7 which is cut perpendicular to one of its optic axes. The spatial evolution of an incident Gaussian beam and its transformation under the effect of CR is shown in FIG. 1a. The light ring is observed at the Lloyd plane 19, which is also called the focal image plane. After the Lloyd plane, the beam then progresses to a series of rings first observed by Poggendorff 21, before evolving to an axial spike first noted by Raman 23.

Finally, the beam returns to the original profile in the far field. The Lloyd plane is also a symmetry plane 25 (FIG. 1b). The centre of the ring in the Lloyd plane is laterally shifted by an amount, denoted here by C, which depends on the crystal length, d, and a factor representing the crystal's ability for conical refraction (FIG. 1a). The direction of this lateral shift can be defined as a property of the crystal orientation. A pseudovector, Λ, can also be empirically defined as being perpendicular to both the beam propagation direction and the direction of the lateral shift obeying a right hand rule. Another feature is related to the longitudinal shift of the Lloyd plane. The longitudinal shift, Δ in FIG. 1a, is given by $$\Delta = d\left(1 - \frac{1}{n}\right). \tag{1}$$

Here n is the refractive index of the crystal in the propagation direction of the photons.

SUMMARY OF THE INVENTION

In accordance with a first aspect of the invention there is provided an optical system comprising an input optical source for projecting a beam along an optical axis and an optical element which creates a cone refractive pattern then reconstructs the beam from the optical source.

In accordance with a second aspect of the invention there is provided a gain medium for a laser having an optical element as described with reference to the first aspect of the invention.

In accordance with a third aspect of the invention there is provided a laser having a gain medium having an optical element as described with reference to the first aspect of the invention.

Preferably, the laser comprises a cavity containing the optical element arranged between an input mirror at a first end of the cavity and an output mirror arranged at the second end of the cavity wherein, the laser is pumped from the first end of the cavity and the output mirror reflects the beam back through the optical element with a phase shift.

Preferably the phase shift is 180°.

Preferably, the input mirror is a concave mirror with high reflectivity at the lasing wavelength.

Preferably, the output mirror is a flat mirror.

Preferably, the optical element is a cascade cone refractive optical element.

Preferably, the optical element comprises a cone refractive crystal arrangement which creates cone refraction at the first crystal and reconstructs the beam by placing one or more additional crystals along the optical path of said beam Optionally, the optical element comprises a cone refractive t crystal arrangement which creates cone refraction at the first crystal and reconstructs the beam by applying a phase shift along the optical path of said beam.

Optionally, the optical element comprises a cone refractive crystal arrangement which creates cone refraction at the first crystal by applying a first pseudovector and reconstructs the beam by applying a second pseudo vector of opposing orientation to the beam.

Preferably, the second pseudovector has substantially opposite orientation to the first pseudovector.

Optionally, the second pseudovector comprises a plurality of pseudovectors of the sum of whose orientations provide the phase shift.

Preferably, the path length through the first and second crystal is substantially identical.

Optionally, the optical source provides a coherent source beam.

Optionally, the optical source provides a non-coherent beam eg

Optionally, the beam is polarised
Optionally, the beam is Circularly polarised
Optionally, the beam is Linearly polarisation Preferably, the laser has a pair of mirrors one of which provides a substantially 180 degree vector shift.

typical rare earth ion doped biaxial crystal gain medium, cut in the direction which exploits the CR phenomenon, the crystal was a 3% Nd-doped KGW and dimensions 3×4×17 mm, cut for propagation along the optical axis. The crystal facets were AR coated at 1067 nm and 808 nm and was mounted in a water-cooled holder at 18° C.

In one aspect of the invention, the invention relates to a novel solid state bulk laser based on cone refractive gain which offers such features as (a) laser stability and new operation rules (b) sub-diffraction limit output (c) excellent beam quality over large range of cavity alignments (d) threshold and performance insensitivity to pump power density and pump beam quality (e) insensitivity to thermal lensing which leads to simple thermal management.

The term optical includes but is not limited to devices, elements and the like which use or operate on electromagnetic radiation in the visible, infra-red, ultraviolet regions of the electromagnetic spectrum or other additional parts of the spectrum at higher or lower wavelengths.

BRIEF DESCRIPTION OF THE DRAWINGS

The present invention will now be described by way of example only with reference to the accompanying drawings in which:

FIGS. 11a and 11b are schematic diagrams of a diode laser and cone refraction laser.

DETAILED DESCRIPTION OF THE DRAWINGS

The invention relates to novel optical systems such as lasers which are based on cone refractive gain caused by the application of pseudovectors of different orientations to an incident beam. The present invention offers features such as (a) laser stability and new operation rules (b) sub-diffraction limit output (c) excellent beam quality over large range of cavity alignments (d) threshold and performance insensitivity to pump power density and pump beam quality (e) insensitivity to thermal lensing which leads to simple thermal management.

Figure 1A:
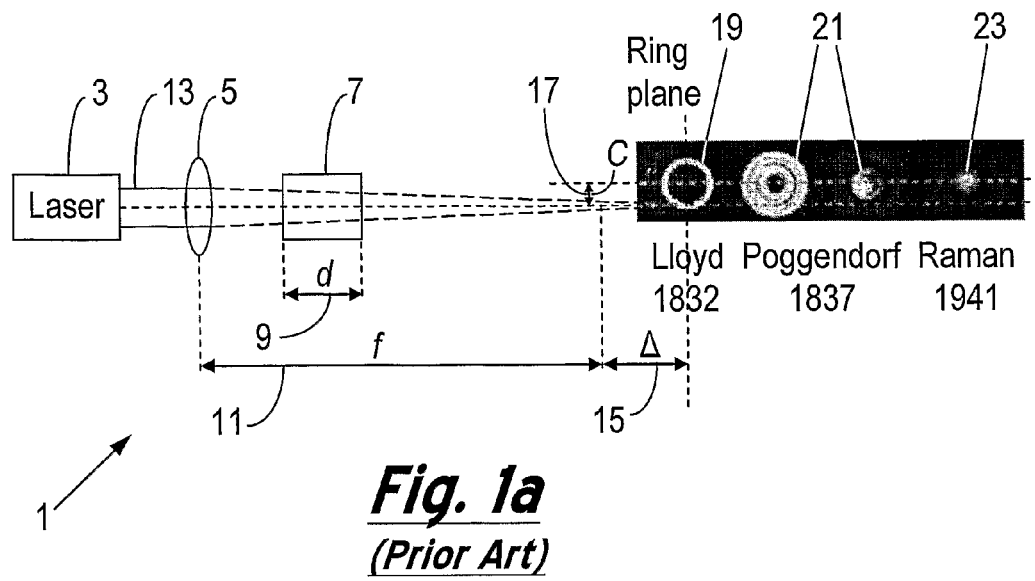
FIGS. 1a and 1b illustrate the known effect of single crystal conical refraction on a focused beam of light.
Figure 1B:
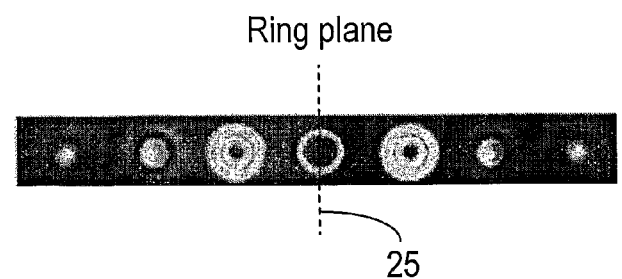
Figure 2:
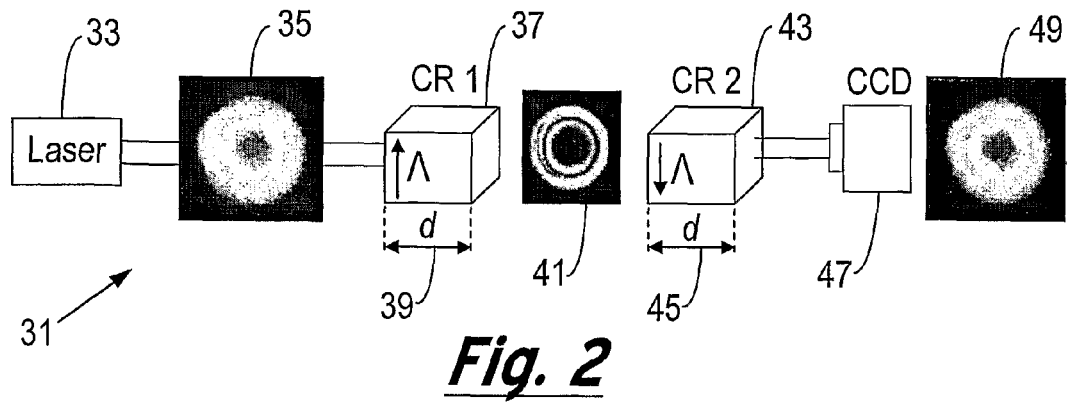
FIG. 2 illustrates an embodiment of the present invention in which two-crystal cascade conical refraction occurs.

In the following example, a cascade scheme comprises applying opposing orientations of the pseudovector Λ to a beam as shown in FIG. 2. In the example where a pair of oppositely oriented crystals are used, and the crystals are correctly aligned the observations are striking: after the first crystal the Lloyd ring is seen but after the beam passes through both crystals, the observed beam had an identical beam profile to the initial Gaussian laser beam before the first crystal.

FIG. 2 shows the experimental setup of cascade conical refraction in accordance with the present invention. The optical system 31 comprises a laser 33 a first CR crystal 37 and a second CR crystal 33 and a Charged coupled device (CCD) 47 positioned along an optical axis. The initial beam profile 35 is shown along with the Lloyd ring resultant from the transmission of the bean through CR 37. The final beam profile 49 is also shown. The two CR crystals have substantially identical length and are orientated with substantially opposite orientations of the pseudovector Λ. When both crystals are in place in the cascade scheme, after the first crystal the Lloyd ring 41 is observed but after the second crystal instead of observing a Lloyd ring, the observed final beam 49 had an identical beam profile to the initial Gaussian beam before the first crystal. This is direct evidence of transformation of an annular beam between the two CR crystals to the original Gaussian beam after the second crystal (CR 2).

In this example of the present invention, the two CRCs, 37, 43 of length 22 mm±20 nm were mounted with opposite orientations of their pseudovectors Λ relative to each other. The collimated, unmodified output of a Helium Neon laser with a beam diameter of 1.5 mm was passed through both crystals. The first crystal was located 15 cm from the laser and the second a further 10 cm away. Each crystal was individually aligned for conical refraction by observing the Lloyd ring on a CCD with no imaging optics located 40 cm from the laser. When both crystals were in the beam path the final output was recorded on the CCD and compared with the profile of the original beam from the laser.

In this embodiment of the invention a laser is used to provide a coherent incident beam. In other similar embodiments, a non-coherent incident beam may be used.

In addition, other configurations of the CR crystals can be used, for example a single crystal may be used with a mirror which reflects the light back through the crystal with a 180° phase shift in order to recreate the original beam. More than two CR crystals may be used to provide a similar effect.

Figure 3:
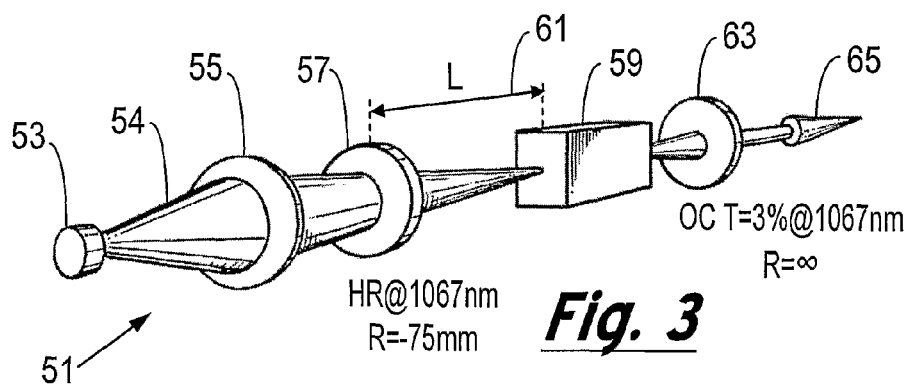
FIG. 3 illustrates a second embodiment of the present invention which is an example of a conical refraction laser.

FIG. 3 shows an example of a conical refraction laser in accordance with the present invention. The laser cavity 51 comprises a pump 53, lens 55 an input mirror 57, CR crystal 59 and output coupler 63. The pump beam 54 is shown along with a distance L 61 between the input mirror 57 and CR crystal 59 and the output beam 65. The apparatus was formed around the active medium (mounted in a metallic water-cooled holder at 20° C.) using the concave mirror 57 (input mirror) with high reflectivity at the lasing wavelength and a flat mirror 63 (output coupler) with 3% transmission at the lasing wavelength. It was end-pumped through the input mirror by an unpolarised, multimode (core diameter of 100 μm, $M^2$=40) fibre coupled diode laser at a wavelength of 808 nm focused on the entrance facet of the crystal.

HR is the 75 mm radius of curvature concave high reflector through which the active medium was optically pumped along the 17 mm axis. OC is the plane output coupler with a transmission of 3% at the lasing wavelength. In this example, the pump beam 54 was focused on the entrance facet of the crystal 59. L 61 may be while the pump beam focus was kept on the entrance facet of the crystal. In addition, the cavity was set to 50 mm and left unchanged whilst the pump mode diameter was varied between 235 and 1570 μm. The laser may be continuous wave or pulsed.

The pump mode diameter was varied using a two-lens system. To ensure alignment for conical refraction the CRC active medium was first aligned with a He—Ne laser until the Lloyd ring was observed on a CCD. The pump was then adjusted to be co-linear with the Helium Neon beam until the observation of a Lloyd ring on the CCD from the pump beam. When the laser was operating above threshold the cavity mirrors were further adjusted until the laser output was also co-linear with the He—Ne beam. The beam quality of the different CRC lasers were assessed by coupling the laser output into a single mode fibre with a core diameter of 6 μm using an aspheric lens with a focal length of 6.2 mm.

The above arrangement is further explained and exemplified as follows. A neodymium ($Nd^{3+}$)-doped $KGd(WO_4)_2$ crystal (Nd:KGW) cut for CR was used as the active medium in the two-mirror cavity (FIG. 3). The laser was end-pumped through the concave high reflector using a multimode fibre coupled diode laser at a wavelength of 808 nm. The plane output coupler introduces a π phase shift to the reflected 1067 nm laser beam. As the reflected beam passes back through the CRC, this phase shift has the same effect as changing the crystal's pseudovector orientation to its opposite value.

Figure 4:
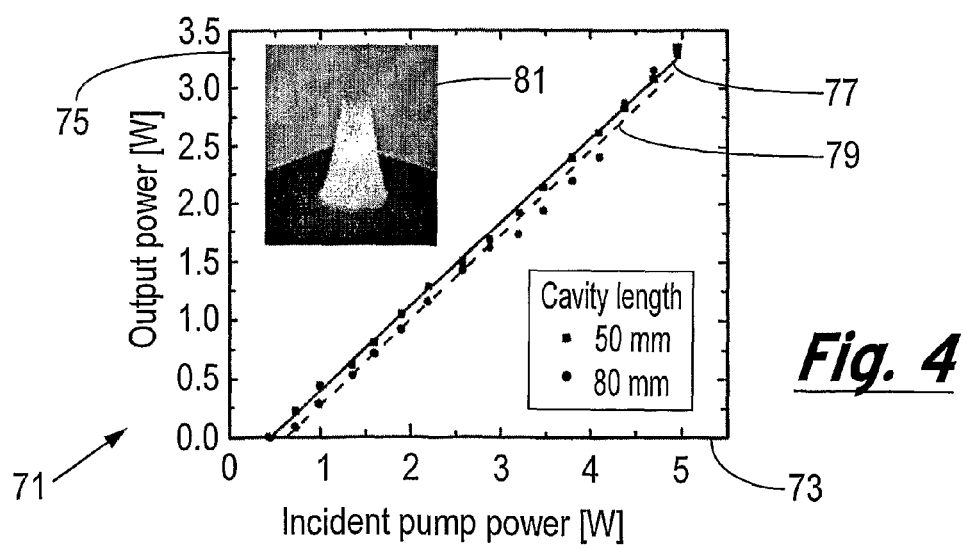
FIG. 4 illustrates the performance of a conical refraction laser in accordance with the present invention.

In the initial experiment the total mirror separation was set to 50 mm. The laser provided 3.3 W of output power at 1067 nm for 5 W of incident pump power at 808 nm, with a lasing threshold of 400 mW of input pump power. The single pass pump absorption in the Nd:KGW was measured to be 98% of the incident pump power. The linear fit to the measured values for output power versus incident pump power revealed an optical-to-optical slope efficiency of 74% (FIG. 4). The quantum defect of the crystal, defined as the proportion of the pumping photon energy that is not turned into the lasing photon energy, is approximately 24%. This limits the theoretical maximum efficiency achievable for this gain medium. Hence, we conclude that the efficiency of the laser was only limited by the very low (~0.1%) cavity loss that is not transmitted through the output coupler. We observed a single, linearly polarized output with a circularly symmetric distribution profile with measured $M^2 \leq 1$ (FIG. 4). As further evidence of the excellent beam quality, we were able to couple over 85% of the laser beam at full power into a single mode fibre.

FIG. 4 is a graph 71 which plots measured output power 75 versus incident pump power 73 for two laser cavities of different lengths when total mirror separation was varied from 50 mm to 80 mm, curves 77 and 79 respectively. The pump mode diameter was set to 400 μm. Both configurations have a slope efficiency of 74%. Inset is the 3-D profile of the laser output 81 from the 50 mm cavity at the maximum output. The efficiency and output beam profile remained constant, independent of the cavity length.

In addition, the distance between the crystal and input mirror L 61 in FIG. 3, was varied in the 80 mm mirror separation cavity, from the crystal entrance facet being ~5 mm from the curved input mirror, to the other end of the cavity being ~60 mm from the input mirror. Provided that the pump focus was maintained on the entrance facet of the crystal and the laser was correctly aligned, no variation in the performance of the laser in terms of output power and beam profile was observed. This behaviour is in stark contrast to the established Gaussian laser theory, where the diameter of the fundamental Gaussian cavity mode varies strongly with the different cavity configurations.

Simple calculations assuming a Gaussian cavity mode show that the mode diameter in the crystal varies from ~160 μm to over 450 μm upon the change of the position of the crystal inside the cavity. This in turn should severely affect the efficiency of the laser output, with the theoretical maximum varying from 37% to 71%.

Figure 5:
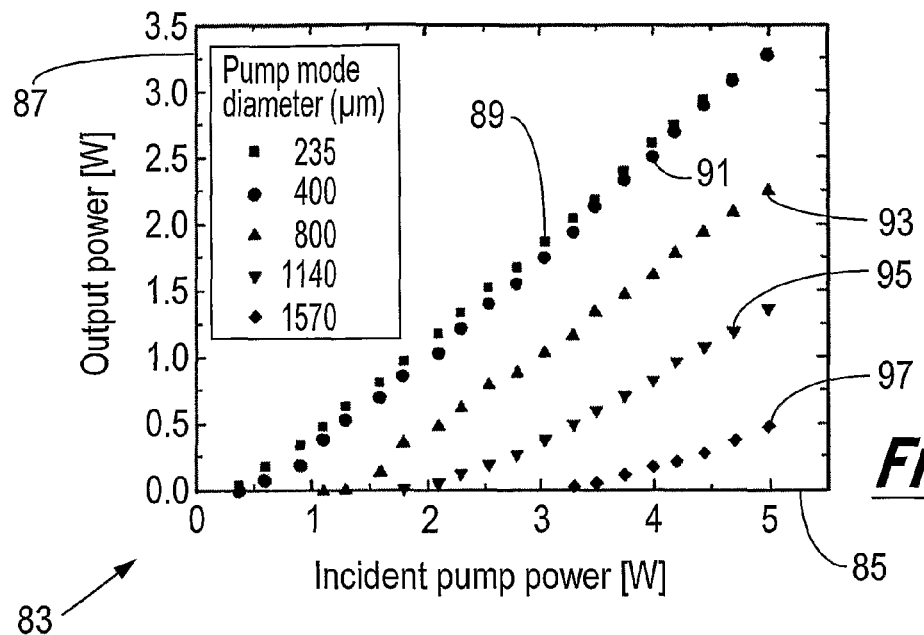
FIG. 5 is a graph of output power versus incident pump power for a set of examples of pump mode diameters in accordance with the present invention.
Figure 6:
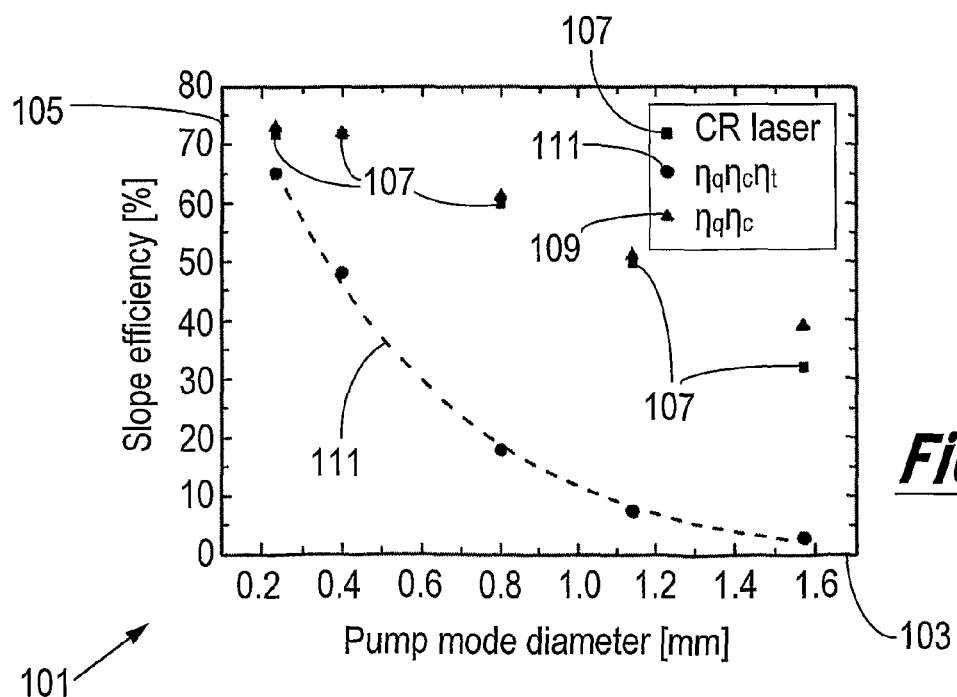
FIG. 6 is a graph of slope efficiency versus pump mode diameter for an example of a CR laser in accordance with the present invention.

FIG. 5 is a graph 83 of incident pump power 85 versus output pump power 87 for various pump mode diameters of 235, 400, 800, 1140 and 1570 μm (reference numerals 89, 91, 93, 95 and 97 respectively). The best performance was obtained for both the 235 and 400 μm pump mode diameters with a slope efficiency of ~74%. FIG. 6 is a graph 101 which plots the pump mode diameter 103 versus slope efficiency 105. Values for the CR laser 107, a theoretical maximum 109 and a Gaussian maximum efficiency 111 are plotted. As the pump diameter increases beyond 400 μm, the efficiency decreases in a near-linear fashion. It is clear that in all cases the efficiency of the laser exceeds that of the maximum theoretical Gaussian efficiency 111. The beam quality of the lasers was assessed and in all cases the measured $M^2 \leq 1$ was observed.

These results were achieved using an ordinary Nd:KGW crystal with identical dimensions to the Nd:KGW cut for CR are in agreement with the observations. A maximum output power of 800 mW was achieved from this conventional laser whilst maintaining a good beam quality when the laser was fully optimised. Above this output power level the beam quality rapidly degraded. This is in contrast to our observation of the CRL providing constant slope efficiency and excellent beam quality irrespective of cavity configurations.

The maximum theoretical slope efficiency, $\eta_s$, of a laser is governed by $$\eta_s = \eta_p \eta_c \eta_t \eta_q, \qquad (2)$$

where $\eta_p$ is the pump efficiency, $\eta_c$ is the cavity efficiency, $\eta_t$ is the transverse efficiency and $\eta_q$ is the quantum efficiency. The pump power was measured at the front facet of the crystal with a single pass absorption of 98%, hence $\eta_p$=0.98. The maximum quantum efficiency achievable with Nd:KGW, $\eta_q$=0.757. The cavity efficiency ($\eta_c$) is reduced by cavity losses that do not contribute to the output power, e.g. scattering losses and crystal defects. These losses increase with the increasing mode area (FIG. 6-reference numeral 109). It is clear that the efficiency observed is only limited by these losses and the maximum quantum efficiency. The transverse efficiency, which is a measure of mismatch between pump and laser modes is of paramount importance in Gaussian lasers. However, there is no dependency in the case of CRLs, as $\eta_t$ must equal unity for the experimentally observed slope efficiencies to be physically possible. Therefore, the CR laser mode is self-adapting to the pump beam mode and the cavity mode, hence rules governing the operation of CRLs are different.

Figure 7:
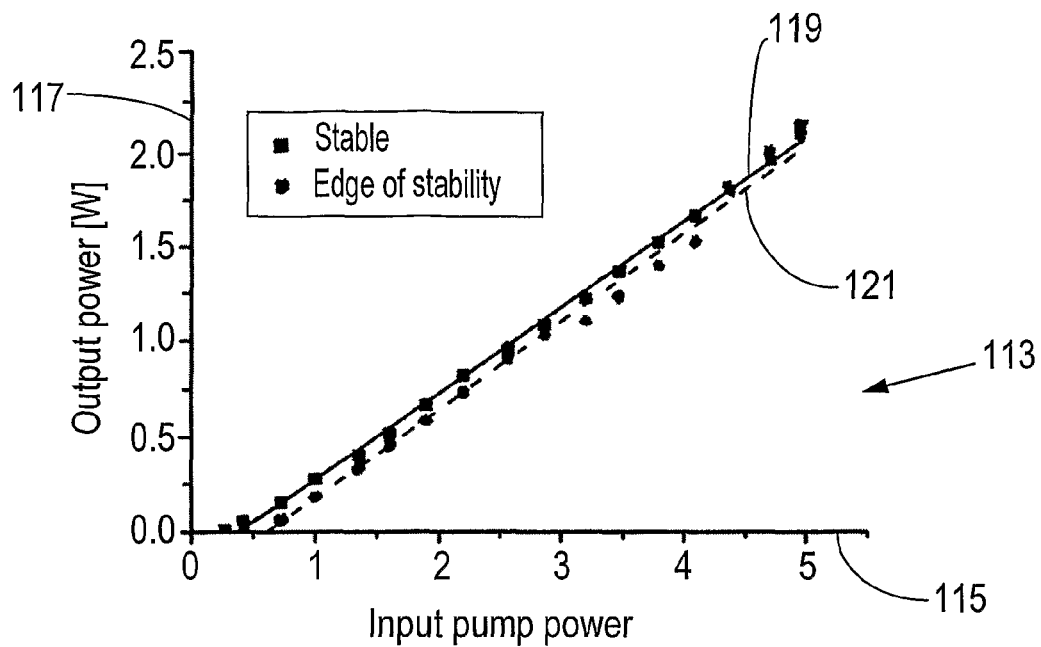
FIG. 7 is a graph of output power versus incident pump power for a further example of the present invention.
Figure 8:
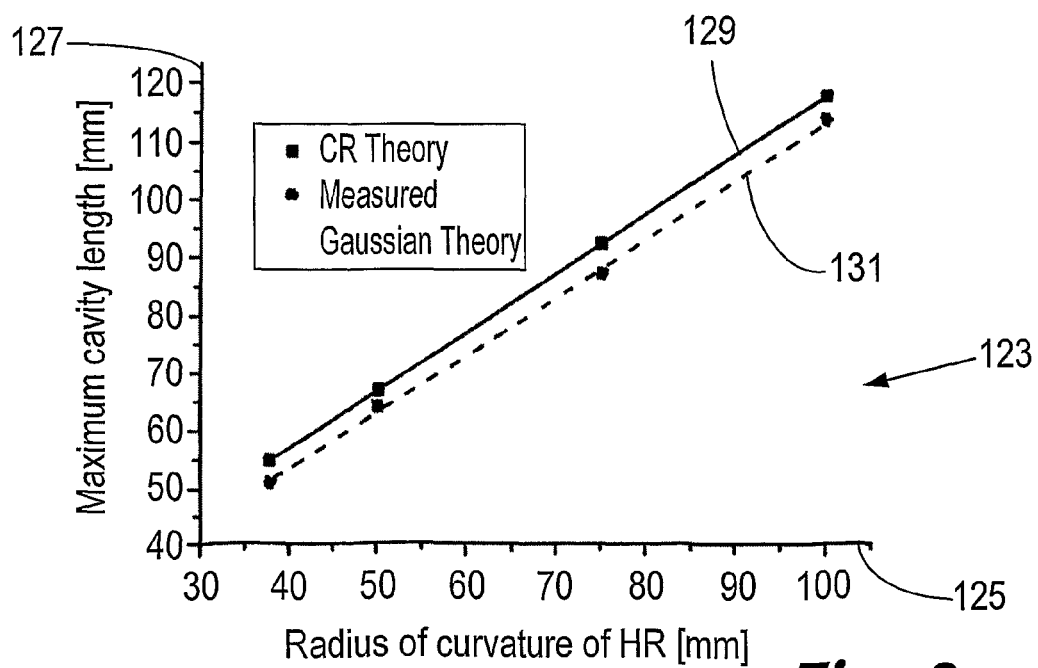
FIG. 8 is a graph of maximum cavity length versus radius of curvature of a high reflector used in an embodiment of the present invention.

FIGS. 7 and 8 show results from a diode pumped conerefringent Nd:KGW laser in a simple two mirror cavity configuration that can operate beyond the Gaussian cavity stability limit and produce excellent beam quality. A simple cavity design rule is presented that predicts the maximum cavity length that is stable for the operation of this laser and also analyse the beam quality of the output.

The crystal was a 3% Nd:KGW and dimensions 3×4×17 mm, cut for propagation along the optical axis. The crystal facets were AR coated at 1067 nm and 808 nm and was mounted in a water-cooled holder at 18° C. The crystal was end pumped through the concave high reflector by a multimode fibre coupled diode laser at 808 nm. The pump focused on the entrance facet of the crystal with a mode diameter of 200 μm. The pump beam was circularly symmetric and had $M^2$~40. The confocal parameter for the pump beam inside the Nd:KGW was calculated to be ~2 mm. The laser cavity was formed using concave high reflector and flat output coupler with 3% transmission. Different concave high reflectors with radius of curvature R=38, 50, 75 and 100 mm were used. In each case the distance between the high reflector and the crystal entrance facet was set to be R/4. A single output with a near circularly symmetric Gaussian profiles with $M^2$<1.05 was observed. The beam quality was unaffected by the cavity length, and excellent beam quality could be achieved in both the stable and unstable configurations at no expense of output power.

FIG. 7 is a graph 113 which shows the combined output power 117 verses incident pump power 115 for both a stable cavity 119 and a cavity near the edge of stability 121, where the radius of curvature of the concave high reflector was 75 mm. In the case of the stable resonator the total mirror separation was 47 mm whereas the case of the cavity near the edge of stability the mirror separation was 79 mm. It can be seen that the output characteristics were almost identical in both cases, with slope efficiencies of 45% and 46% respectively. This relatively low slope efficiency is due to the low transmission of the output coupler available at present.

FIG. 8 is a graph 123 which plots maximum cavity length versus radius of curvature 125. This shows improved output power and beam quality for a laser that was working beyond the classical Gaussian stability limit.

Figure 9:
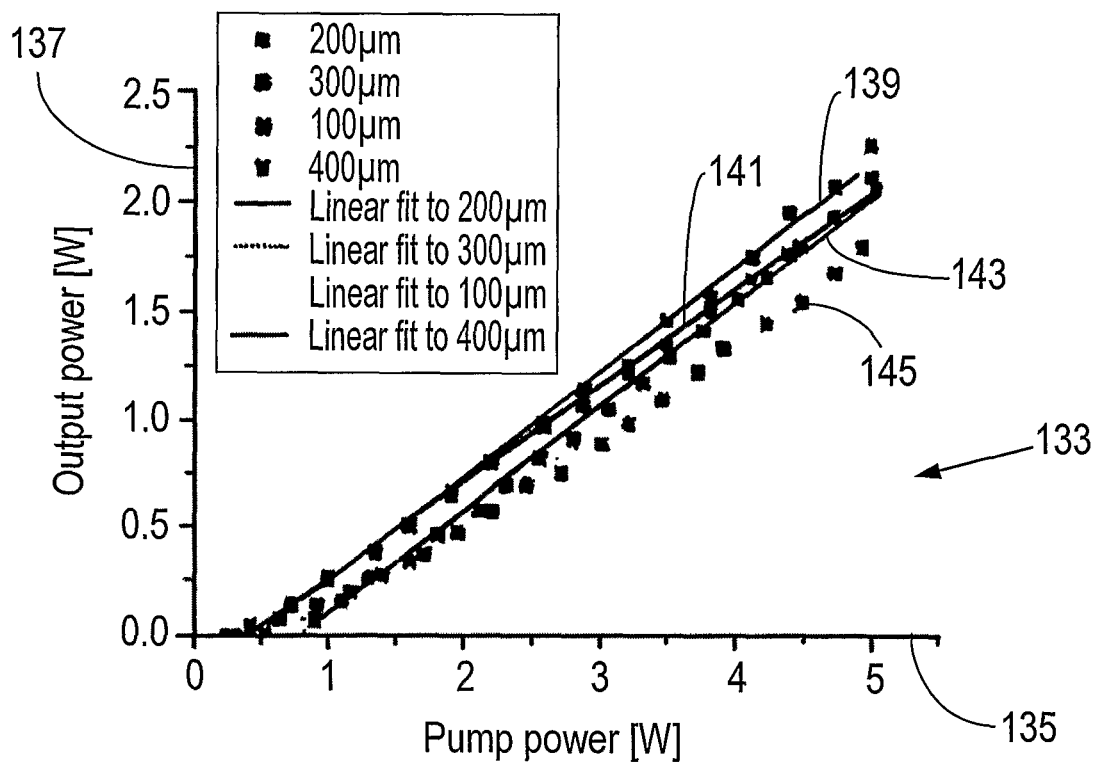
FIG. 9 is a graph of output power versus pump power for another set of examples of pump mode diameters in accordance with the present invention.

Another example of the present invention is reported in relation to FIG. 9. As with the example described in relation to FIGS. 7 and 8, the crystal was a 3% Nd-doped KGW and dimensions 3×4×17 mm, cut for propagation along the optical axis. The crystal facets were AR coated at 1067 nm and 808 nm and was mounted in a water-cooled holder at 18° C. The crystal was end pumped through the concave high reflector with radius of curvature 75 mm, by a multimode fibre coupled diode laser at 808 nm. A 3% plane output coupler formed the second cavity mirror. The mirror separation was fixed at 47 mm and the distance from the curved high reflector to the crystal entrance facet was set to 18 mm. The pump was focused on the entrance facet of the crystal was varied with mode diameters of 100, 200, 300 and 400 μm. The pump beam was circularly symmetric and highly multimode ($M^2>40$). FIG. 9 shows the output power 137 verses incident pump power 135 for the pump mode diameters 200, 300 100 and 400 microns (curves 139, 141, 143 and 145 respectively). The output beam was characterised to have a circularly symmetric Gaussian profile with $M^2<1.05$ in all cases. It can be seen that the output characteristics were almost identical in all cases, with slope efficiencies increasing from 40 to 48% with increasing pump spot size. This relatively low slope efficiency is due to the low transmission of the output coupler available at present. Remarkably the threshold was almost independent of pump diameter. This is in stark contrast to established diode end pumped solid state laser theory, where the threshold should be strongly dependant on the pump size, as the fundamental Gaussian cavity mode remains unchanged between all the lasers.

Lasers based on conical refractive element active media provide simplicity and flexibility in resonator design in terms of mode matching, thermal management and requirements on pump beam quality. The presented results pave an alternative route towards power and brightness sealing in end pumped solid state bulk lasers.

The above demonstrates a unique case of cascade conical refraction, which forms the basis of the presented CR lasers. The observations are of paramount importance in the field of photonics, especially since conical refraction has traditionally been considered as "little more than a curious optical phenomenon which had no conceivable application".

The following are examples of the use of a device in accordance with the present invention.

Biophotonics

It is widely accepted that bio-photonic applications of lasers have not been optimised, with applications simply using the sources available with no consideration of the optimum laser type. This is also true for laser micro-dissection. One requirement is for ultra-short pulses with greater than $1\times10^6$ W peak power sub-picosecond durations for 3D micro-dissection and nanosurgery. It is also known that this power range is beyond the damage threshold for fibre lasers. This power level cannot be achieved in compact configuration without additional amplification. However, the cone-refringent laser may have the capability to produce such parameters in a highly compact configuration.

Optical Tweezing

The present invention may also be used as a low-cost high power CW laser system for optical tweezing.

New Laser Sources

CR elements as gain media in DPSS (Diode-Pumped Solid-State) bulk lasers.

A laser based on a typical rare earth ion doped biaxial crystal gain medium, cut in the direction which exploits the CR phenomenon, provides a new generation of ultra-efficient self-adapting DPSS bulk lasers capable of covering a very wide spectral range.

It has been demonstrated that the efficiency of these lasers is only confined by the fundamental maximum achievable quantum efficiency limit (FIG. 6). Hence, the construction of CR laser sources can provide more efficient, higher power, better beam quality, greater reliability, and reduced maintenance. Compactness, simplicity of design and manufacture will enable consequently lower cost in comparison to the current available equivalent performance lasers in the market.

The industrial state of the art for high peak power lasers is currently a 25 kW thin-disk laser with almost diffraction limited quality. As the high intensities in the fibres limit the peak power, the disk concept is better suited for high peak powers than the fibre. However, the industrial state of the art would also be to use fibre as the best existing beam quality. CR lasers offer the capability to combine both these levels of state of the art performance in power and quality while competing with diodes for cost, efficiency, maintenance and reliability.

New State-of the-Art in Laser Efficiency

The efficiency of a CR oscillator is outstanding. Commercial high power disk and fibre lasers today exhibit wall-plug efficiencies of 10-15%. Probably linked to the exceptional beam quality produced and the non-Gaussian behaviour of the CR generated beam CR laser have the potential to reach much higher efficiencies.

An ultra-efficient Nd:KGW laser in a simple two mirror cavity in accordance with the invention, may produce 3.4 W of output power in the one-micron spectra region for only 5 W of the incident pump power from a multimode diode source with a poor beam quality (M2~40) at near infrared. The resulting optical-to-optical efficiency of the laser was ~70% (slope efficiency of 74%). Furthermore, the efficiency of the laser was limited only by the quantum defect heating in the crystal, which is the fundamental limit for Nd-doped crystals. The output of the laser was examined to be of the highest quality (M2~1) despite the poor beam quality of the pump source. An 85% coupling efficiency of the laser output into a single mode fibre has also been achieved.

It is anticipated that by using CR crystals with a lower quantum defect level (such as Yb-doped crystal) at least a doubling of the existing state of the art efficiency will be achieved.

New State-of-the-Art in Solid State Laser Simplicity, Compactness and Cost

Figure 10A:
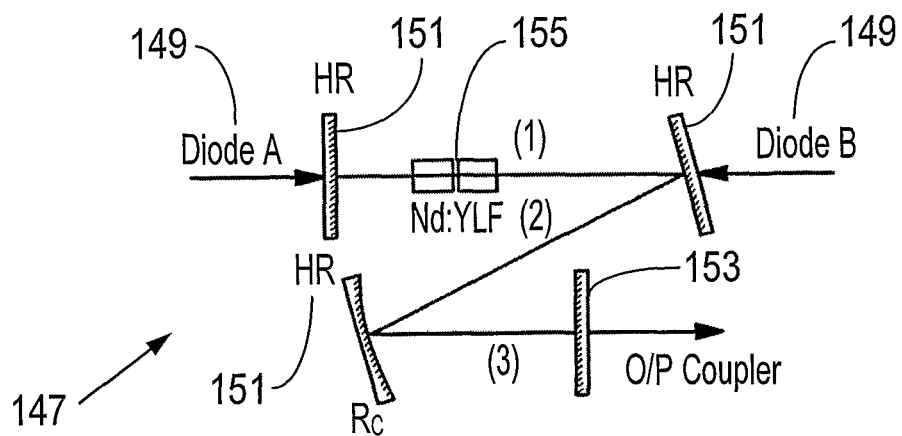
FIG. 10 is a graph of output power versus pump power for another set of examples of pump mode diameters in accordance with the present invention.
Figure 10B:
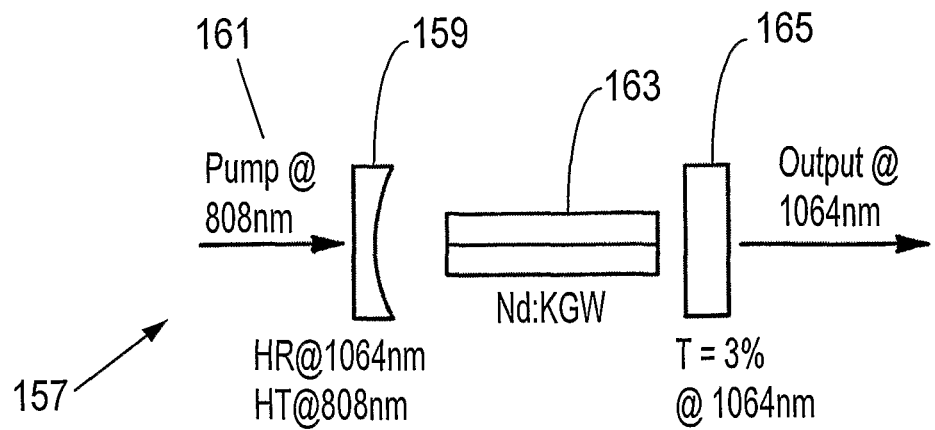

FIGS. 10a and 10b illustrate the lack of complexity in a CR laser and the improved beam quality. This is expected to directly translate into faster manufacturing, more compact devices with significantly lower cost.

a) Simplified schematic diagram of a typical solid-state bulk laser 147 (based on Nd:YAG) for CW high-power high-brightness operation at 1 micron. The resonator consists of 4 mirrors (three high reflectors HR 151 and an O/P coupler 153) and the active medium 155 is being pumped from both ends by two diode bars to compensate for the poor beam quality of the pump sources. The thermal load in the material limits further brightness scaling. Any attempt in improving the beam quality of the pump beam, e.g. via fibre-bulk hybrid schemes, adds further complexity to the setup.

A typical diagram for a solid-state bulk laser (based on Nd:KGW) based on the CR crystal technology for CW high-power high-brightness operation. The resonator consists of only two mirrors (one high reflectors HR 159 and a 3% O/P coupler 165) and the active medium 163 is being pumped only one diode bar 161. The thermal management is not an issue for this case since uniform pumping can be achieved regardless of the pump beam quality, all owing to the CR crystal technology.

Optical Manipulation

The unique cone shaped beam emerging after the CR element may be used as optical tweezers with very special properties. The donut shaped beam cross section may be used to solve difficulties in single cell sorting experienced with existing technology by allowing objects to be encircled and moved independently within their environment.

Improvements and modifications may be incorporated herein without deviating from the scope of the invention.

The invention claimed is:

1. An optical system comprising:
   an input optical source configured for projecting an input beam along an optical axis, wherein the input beam has a Gaussian beam profile;
   and an optical element having a first cone refracted element configured to create a cone refracted beam from the input beam, wherein the optical element is arranged to reconstruct the cone refracted bean using a reconstructing optical element configured to apply a phase shift to the cone refracted beam such that the reconstructed beam has substantially the same Gaussian beam profile as the input beam.

2. The optical system of claim 1, wherein the first cone refractive element is configured to create cone refraction by applying a first pseudovector and the reconstructing optical element is configured to reconstruct the input beam by applying to the cone refracted beam a second pseudo vector of opposing orientation.

3. The optical system of claim 2, wherein the second pseudovector has substantially opposite orientation to the first pseudovector.

4. The optical system of claim 3, wherein the second pseudovector comprises a plurality of pseudovectors the sum of whose orientations provide the phase shift.

5. The optical system of claim 1, wherein the optical element has a predetermined optical path length through which the input beam is transmitted to create the cone refracted beam.

6. The optical system of claim 1, wherein the reconstructing optical element has a predetermined optical path length through which the cone refracted beam is transmitted to create a reconstructing beam.

7. The optical system of claim 1, wherein the reconstructing optical element is a second cone refractive element.

8. The optical system of claim 1, wherein the reconstructing optical element comprises one or more additional cone refractive elements positioned along the optical path of the cone refracted beam.

9. The optical system of claim 1, wherein the reconstructing optical element comprises a reflector, wherein the reflector reflects a cone reflected beam back through the first cone refractive element thereby applying a phase shift to the cone refractive beam and reconstructing the input beam.

10. The optical system of claim 6, wherein the predetermined optical path length through which a phase shift is applied through the first cone refractive element and the reconstructing optical element are substantially identical.

11. The optical system of claim 1, wherein the phase shift is 180°.

12. The optical system of claim 1, wherein the optical source provides a coherent source beam.

13. The optical system of claim 1, wherein the optical source provides a non-coherent beam.

14. The optical system of claim 1, wherein the input beam is polarized.

15. The optical system of claim 1, wherein the input beam is circularly polarized.

16. The optical system of claim 1, wherein the first cone refractive element comprises a rare earth ion doped biaxial crystal cut in a direction to enable conical refraction.

17. The optical system of claim 16, wherein the crystal is a Neodymium doped Potassium Gadolinium Tungstate crystal.

18. A gain medium for a laser comprising:
    a first cone refractive element configured to create a cone refracted beam from an input beam, wherein the input beam has a Gaussian beam profile; and
    a reconstructing optical element comprising any one of a reflector, a second cone refractive element, or a combination of a reflector and a second cone refractive element;
    wherein the reconstructing optical element is configured to apply a phase shift to the cone refracted beam to reconstruct the cone refracted beam such that the reconstructed beam has substantially the same Gaussian beam profile as the input beam.

19. A laser comprising:
    a gain medium having:
      a first cone refractive element configured to create a cone refracted beam from an input beam, wherein the input beam has a Gaussian beam profile; and
      a reconstructing optical element comprising any one of a reflector, a second cone refractive element, or a combination of a reflector and a second cone refractive element;
      wherein the reconstructing optical element is configured to apply a phase shift to the cone refracted beam to reconstruct the cone refracted beam such that the reconstructed beam has substantially the same Gaussian beam profile as the input beam.

20. The laser as claimed in claim 19, wherein the laser comprises a cavity containing the gain medium arranged between an input mirror at a first end of the cavity and an output mirror arranged at the second end of the cavity, wherein the laser is pumped from the first end of the cavity and the output mirror reflects the beam back through the optical element with a phase shift.

* * * * *

UNITED STATES PATENT AND TRADEMARK OFFICE
CERTIFICATE OF CORRECTION

| | | |
|---|---|---|
| PATENT NO. | : 8,542,712 B2 | Page 1 of 1 |
| APPLICATION NO. | : 13/145736 | |
| DATED | : September 24, 2013 | |
| INVENTOR(S) | : Edik Rafailov, Amin Abdolvand and Todor Kalkandjiev | |

It is certified that error appears in the above-identified patent and that said Letters Patent is hereby corrected as shown below:

In the Specification

In the Brief Description of the Drawings

Column 3, lines 32 to 34
Please delete the following lines.
"Figure 10 is a graph of output power versus pump power for another set of examples of pump mode diameters in accordance with the present invention; and"

Column 3, line 35
please delete
"Figures 11a and 11b are schematic diagrams of a diode laser and cone refraction laser."
and replace with
--Figures 10a and 10b are schematic diagrams of a diode laser and cone refraction laser--

Signed and Sealed this
Nineteenth Day of November, 2013

Teresa Stanek Rea
*Deputy Director of the United States Patent and Trademark Office*